US008874279B2

(12) United States Patent
Frye et al.

(10) Patent No.: US 8,874,279 B2
(45) Date of Patent: Oct. 28, 2014

(54) VEHICLE-INCIDENT DETECTION METHOD AND SYSTEM

(75) Inventors: Mark S. Frye, Grosse Pointe Woods, MI (US); Lawrence D. Cepuran, Northville, MI (US); Steven Swanson, Commerce Township, MI (US); Charles A. Everhart, Canton, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 13/606,851

(22) Filed: Sep. 7, 2012

(65) Prior Publication Data

US 2014/0074315 A1  Mar. 13, 2014

(51) Int. Cl.
G06F 7/00 (2006.01)
G06F 17/00 (2006.01)
G08G 1/01 (2006.01)

(52) U.S. Cl.
CPC ... G08G 1/01 (2013.01); G06F 7/00 (2013.01)
USPC .......................................................... 701/1

(58) Field of Classification Search
CPC .................................... G08G 1/01; G06F 7/00
USPC .......................................................... 701/1
See application file for complete search history.

(56) References Cited

U.S. PATENT DOCUMENTS

| 5,936,518 | A | 8/1999 | Fukui et al. |
| 6,812,832 | B2 | 11/2004 | Lobaza et al. |
| 7,119,669 | B2 | 10/2006 | Lundsgaard et al. |
| 7,394,355 | B2 | 7/2008 | Sjonell |
| 7,409,295 | B2 | 8/2008 | Paradie |
| 7,486,803 | B2 | 2/2009 | Camus |
| 2005/0030224 | A1 | 2/2005 | Kock |
| 2006/0137929 | A1 | 6/2006 | Yoshida |
| 2008/0111666 | A1 | 5/2008 | Plante et al. |
| 2010/0094520 | A1 | 4/2010 | Zagorski |

OTHER PUBLICATIONS

Squatriglia, Chuck, "toyota, Microsoft to Bring the Cloud to Cars", <<http://web.archive.org/web/20110410132925/http:/www.wired.com/autopia/2011/04toyota-microsoft-to-bring-the-cloud-to-cars/>>, Apr. 6, 2011, pp. 3.*

* cited by examiner

Primary Examiner — Mary Cheung
Assistant Examiner — Anne Mazzara
(74) Attorney, Agent, or Firm — Dierker & Associates, P.C.

(57) ABSTRACT

A vehicle-incident detection method is disclosed herein. Vehicle data is received at a cloud computing system from a vehicle, where the vehicle data is generated by the vehicle in response to an initial detection of a vehicle-related event. After receiving the data, the cloud computing system requests additional vehicle data from the vehicle. The additional vehicle data is generated by the vehicle at a time subsequent to the initial detection of the vehicle-related event. The additional vehicle data is received from the vehicle, and an application resident in the cloud computing system analyzes the vehicle data and the additional vehicle data to determine that the vehicle-related event occurred. The application includes computer readable code embedded on a non-transitory, tangible computer readable medium for performing the analyzing. Also disclosed herein is a vehicle-incident detection system.

23 Claims, 4 Drawing Sheets

VEHICLE-INCIDENT DETECTION METHOD AND SYSTEM

TECHNICAL FIELD

The present disclosure relates generally to vehicle-incident detection methods and systems.

BACKGROUND

Vehicles may be equipped, for example, with a vehicle-incident detection system, such as, e.g., an automatic crash notification system, which may be part of a telematics control unit or an aftermarket product. Upon detecting that a vehicle incident has occurred, the vehicle-incident detection system is designed, in some instances, to automatically notify a proper authority (e.g., a call center advisor, a vehicle emergency center, a local police station, etc.) that the vehicle incident has occurred.

SUMMARY

Examples of a vehicle-incident detection method are disclosed herein. In one example of the method, vehicle data is received at a cloud computing system from a vehicle. The vehicle data is generated by the vehicle in response to an initial detection of a vehicle-related event. After receiving the data, the cloud computing system requests additional vehicle data from the vehicle, where the additional vehicle data is generated by the vehicle at a time subsequent to the initial detection of the vehicle-related event. The additional vehicle data is received from the vehicle. By an application resident in the cloud computing system, the vehicle data and the additional vehicle data are analyzed to determine that the vehicle-related event occurred. The application resident in the cloud computing system includes computer readable code embedded on a non-transitory, tangible computer readable medium for performing the analysis.

Examples of a vehicle-incident detection system are also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
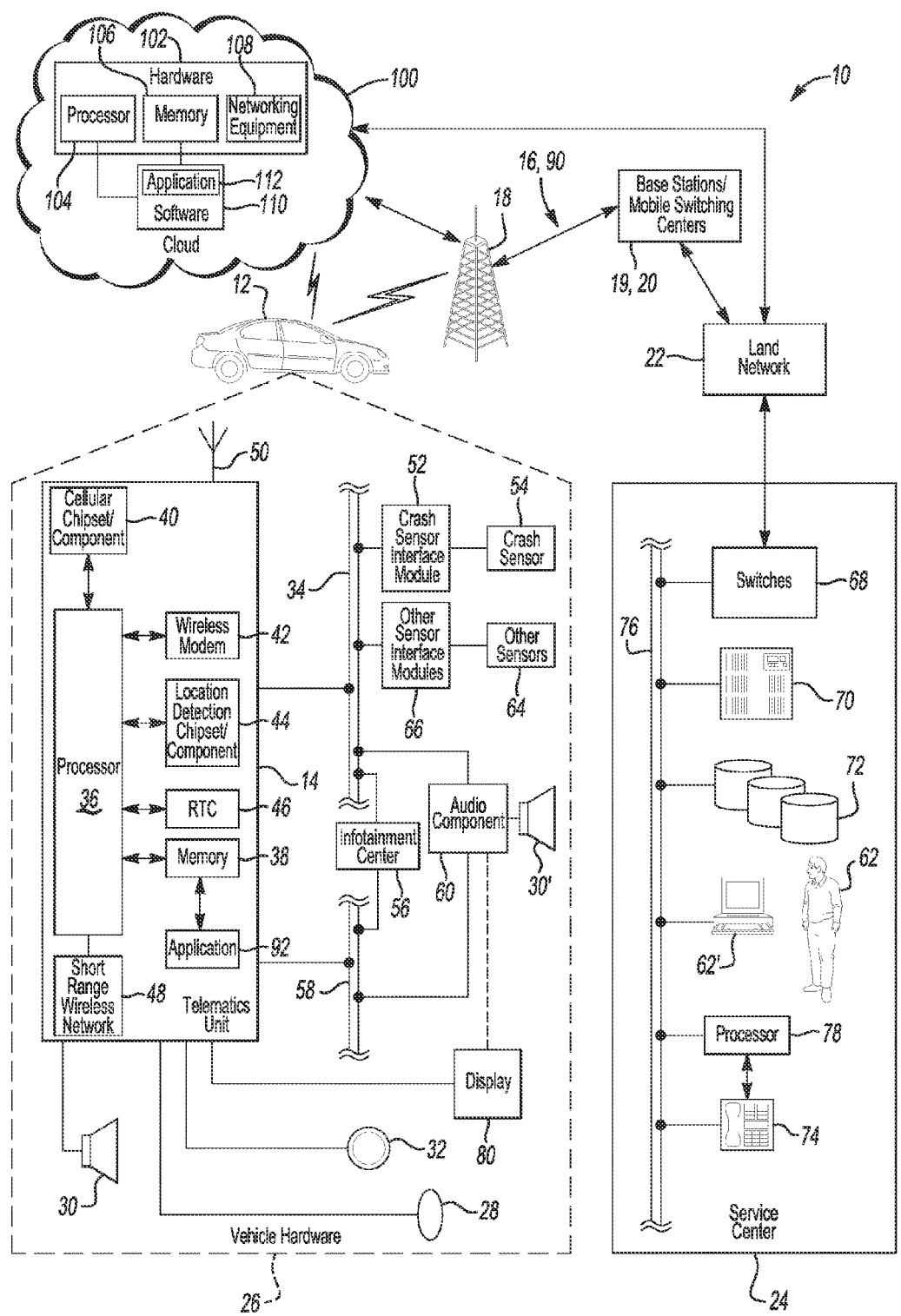
FIG. 1 is a schematic diagram depicting an example of a vehicle-incident detection system.

Examples of the vehicle-incident detection method and system, as disclosed herein, may be used to verify that a vehicle has been involved in a vehicle incident, such as a vehicle accident, a vehicle crash, and/or the like. The examples of the method and system utilize an application that is resident in a cloud computing system, and the application includes computer readable code for determining whether or not messages from in-vehicle detectors represent vehicle incidents. For instance, the system uses at least two sets of data to determine that a vehicle-related event occurred. First, the method and system utilize in-vehicle sensor data generated in response to a potential event, such as data generated from one or more accelerometers operatively disposed in the vehicle. Second, the cloud computing system receives at least one set of additional data from the vehicle, where the additional data represents vehicle operation after the potential event. The two or more sets of data, together, may be used to classify an initially detected vehicle-related event as a vehicle-related event that has occurred. If the application determines that the vehicle-related event has occurred, then in some examples disclosed herein, the cloud computing system is further configured to notify a third party (e.g., a vehicle service center or other backend system) that the vehicle-related event has occurred. Upon receiving the notification, the third party may, for instance, contact a proper authority to dispatch emergency and/or medical assistance to the vehicle involved in the event.

The method and system of the present disclosure assess inputs from vehicle system(s) during and after a potential event to determine that a vehicle-related event has occurred or has not occurred. By combining multiple inputs (e.g., vehicle speed, heading, PRNDL status, etc.), a broader data set may be used to make the determination.

As used herein, a "vehicle-related event" or a "vehicle incident" refers to an event involving a vehicle during the operation thereof (i.e., when the vehicle ignition and the vehicle electrical system are both in an ON state), and the detection of which may be desired by a remote service, such as a telematics service center.

Further, the term "user" refers to a vehicle owner, a vehicle driver, and/or a vehicle passenger. In instances where the user is the vehicle owner, the term "user" may be used interchangeably with the terms subscriber and/or service subscriber.

Further, the term "communication" is to be construed to include all forms of communication, including direct and indirect communication. Indirect communication may include communication between two components with additional component(s) located therebetween.

The terms "connect/connected/connection" and/or the like are broadly defined herein to encompass a variety of divergent connected arrangements and assembly techniques. These arrangements and techniques include, but are not limited to (1) the direct connection or communication between one component and another component with no intervening components therebetween; and (2) the connection or communication of one component and another component with one or more components therebetween, provided that the one component being "connected to" the other component is somehow in operative communication with the other component (notwithstanding the presence of one or more additional components therebetween).

FIG. 1 described in detail below depicts an example of a vehicle-incident detection system 10. This system 10 is one example of a system that may be used to perform the steps of the examples of the vehicle-incident detection method described in detail below. It is to be understood that other examples of systems may also be used to perform the examples of the method disclosed herein, and that one skilled in the art would know how to modify the teachings of the present disclosure in order to apply the other examples.

Referring now to FIG. 1, the vehicle-incident detection system 10 generally includes a mobile vehicle 12, a telematics unit 14 operatively disposed in the vehicle 12, a carrier/communication system 16 (including one or more cell towers 18, one or more base stations 19 and/or mobile switching centers (MSCs) 20, and one or more service providers (e.g., 90) including mobile network operator(s)), one or more land networks 22, and one or more vehicle service centers 24, such as telematics call centers. In an example, the carrier/communication system 16 is a two-way radio frequency communication system, and may be configured with a web application supporting system-to-system communications (e.g., communications between the service center 24 and the service provider 90).

Some of the architecture, setup, and operation, as well as many of the individual components of the system 10 shown in FIG. 1 are generally known in the art. Thus, the following paragraphs provide a brief overview of one example of the system 10.

Vehicle 12 may be a mobile land vehicle (such as a motorcycle, car, truck, recreational vehicle (RV), or the like), a water vehicle (such as a boat) or an air vehicle (such as a plane, helicopter, or the like), and the vehicle 12 is equipped with suitable hardware and software that enables it to communicate (e.g., transmit and/or receive voice and data communications) over the carrier/communication system 16.

Some of the vehicle hardware 26 is generally shown in FIG. 1, including the telematics unit 14 and other components that are operatively connected to the telematics unit 14. Examples of other hardware 26 components include a microphone 28, speakers 30, 30' and buttons, knobs, switches, keyboards, and/or controls 32. Generally, these hardware 26 components enable a user to communicate with the telematics unit 14 and any other system 10 components in communication with the telematics unit 14. It is to be understood that the vehicle 12 may also include additional components suitable for use in, or in connection with, the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections, such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard vehicle dedicated communications device. In an example, the telematics unit 14 is linked to the service center 24 via the carrier system 16, and is capable of calling and transmitting data to the service center 24. The telematics unit 14 is also linked to a cloud computing system 100 (referred to hereinbelow as the "cloud") via the carrier system 16 or another system (e.g., the Internet), and is capable of transmitting data to, and receiving data from the cloud 100.

The telematics unit 14 provides a variety of services, both individually and through its communication with the service center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUE-TOOTH® unit or a unit enabled with WiFi™), and a dual antenna 50. In one example, the wireless modem 42 includes a computer program and/or set of software routines (i.e., computer readable code/instructions embedded on a non-transitory, tangible medium) executing within processing device 36.

It is to be understood that the telematics unit 14 may be implemented without one or more of the above listed components (e.g., the real time clock 46). It is to be further understood that telematics unit 14 may also include additional components and functionality as desired for a particular end use.

The electronic processing device 36 of the telematics unit 14 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The electronic processing device 36 (also referred to herein as a processor) may, for example, execute software programs having computer readable code embedded on a tangible, non-transitory computer readable medium to initiate and/or perform various functions of the telematics unit 14 and to initiate and/or perform various steps of the examples of the vehicle-incident detection method disclosed herein. For instance, the processor 36 is capable of executing an application 92, which is a software program (stored, e.g., in memory 38) that includes computer readable code embedded on a non-transitory, tangible computer readable medium for formulating messages containing vehicle data. These messages may be transmitted to a cloud computing system (e.g., the cloud 100) using the bus 34. The vehicle data contained in the messages may then be used by an application 112 resident in the cloud 100 to determine that a vehicle-related event has occurred. In an example, the messages may be formulated as short message service (SMS) messages or packetized data messages. As will be described in further detail below, the messages are transmitted to the cloud 100, and the application 112 run by a processor 104 at the cloud 100 analyzes the vehicle data extracted from the messages to determine that the vehicle-related event has occurred.

Still referring to FIG. 1, the location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). In an example, the location detection chipset/component 44 may provide then-current GPS location data of the vehicle 12, and the GPS location data may be included in the message(s) to be sent to the cloud 100. Examples of how the GPS location data may be used by the cloud 100 to render a determination about a vehicle-related event will be described in further detail below.

The cellular chipset/component 40 may be an analog, digital, dual-mode, dual-band, multi-mode and/or multi-band cellular phone. Basically, the cellular chipset 40 is a semiconductor engine that enables the telematics unit 14 to connect with other devices (e.g., another mobile communications device) using some suitable type of wireless technology. The cellular chipset-component 40 uses one or more prescribed frequencies in the 800 MHz analog band or in the 800 MHz, 900 MHz, 1900 MHz and higher digital cellular bands. In some cases, the cellular chipset/component 40 may also use a frequency below 800 MHz, such as 700 MHz or lower. In yet other cases, the cellular chipset/component 40 may use a frequency above 2600 MHz. Any suitable protocol may be used, including digital transmission technologies, such as TDMA (time division multiple access), CDMA (code division multiple access), GSM (global system for mobile telecommunications), and LTE (long term evolution). In some instances, the protocol may be short range wireless communication technologies, such as BLUETOOTH®, dedicated short range communications (DSRC), or Wi-Fi™. In other instances, the protocol is Evolution Data Optimized (EVDO) Rev B (3G) or Long Term Evolution (LTE) (4G). In an example, the cellular chipset/component 40 may be used in addition to other components of the telematics unit 14 to establish communications between the vehicle 12 and another party.

Also associated with electronic processing device 36 is the previously mentioned real time clock (RTC) 46, which provides accurate date and time information to the telematics unit 14 hardware and software components that may require and/or request date and time information. In an example, the RTC 46 may provide date and time information periodically, such as, for example, every ten milliseconds.

The electronic memory 38 of the telematics unit 14 may be configured to store data associated with the various systems of the vehicle 12 (i.e., vehicle data), vehicle operations, vehicle user preferences and/or personal information, application(s) or other software programs, and the like.

The telematics unit 14 provides numerous services alone or in conjunction with the telematics service center 24, some of which may not be listed herein, and is configured to fulfill one or more user or subscriber requests. Several examples of these services include, but are not limited to: turn-by-turn directions and other navigation-related services provided in conjunction with the GPS based chipset/component 44; airbag deployment notification and other emergency or roadside assistance-related services provided in connection with various crash and/or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering. It is to be understood that when these services are obtained from the telematics service center 24, the telematics unit 14 is considered to be operating in a telematics service mode.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. In one example, an Evolution Data Optimized (EVDO) Rev B (3G) system (which offers a data rate of about 14.7 Mbit/s) or a Long Term Evolution (LTE) (4G) system (which offers a data rate of up to about 1 Gbit/s) may be used. These systems permit the transmission of both voice and data simultaneously. Generally, dual mode antenna 50 services the location detection chipset/component 44 and the cellular chipset/component 40.

The microphone 28 provides the user with a means for inputting verbal or other auditory commands, and can be equipped with an embedded voice processing unit utilizing human/machine interface (HMI) technology known in the art. Conversely, speaker(s) 30, 30' provide verbal output to the vehicle occupants and can be either a stand-alone speaker 30 specifically dedicated for use with the telematics unit 14 or can be part of a vehicle audio component 60, such as speaker 30'. In either event and as previously mentioned, microphone 28 and speaker(s) 30, 30' enable vehicle hardware 26 and the telematics service center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the telematics service center 24 (whether it be with a live advisor 62 or an automated call response system 62') to request services, to initiate a voice call to another mobile communications device, etc.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system (e.g., speaker 30'), or may utilize speaker 30 via arbitration on vehicle bus 34 and/or audio bus 58.

Figure 3A:
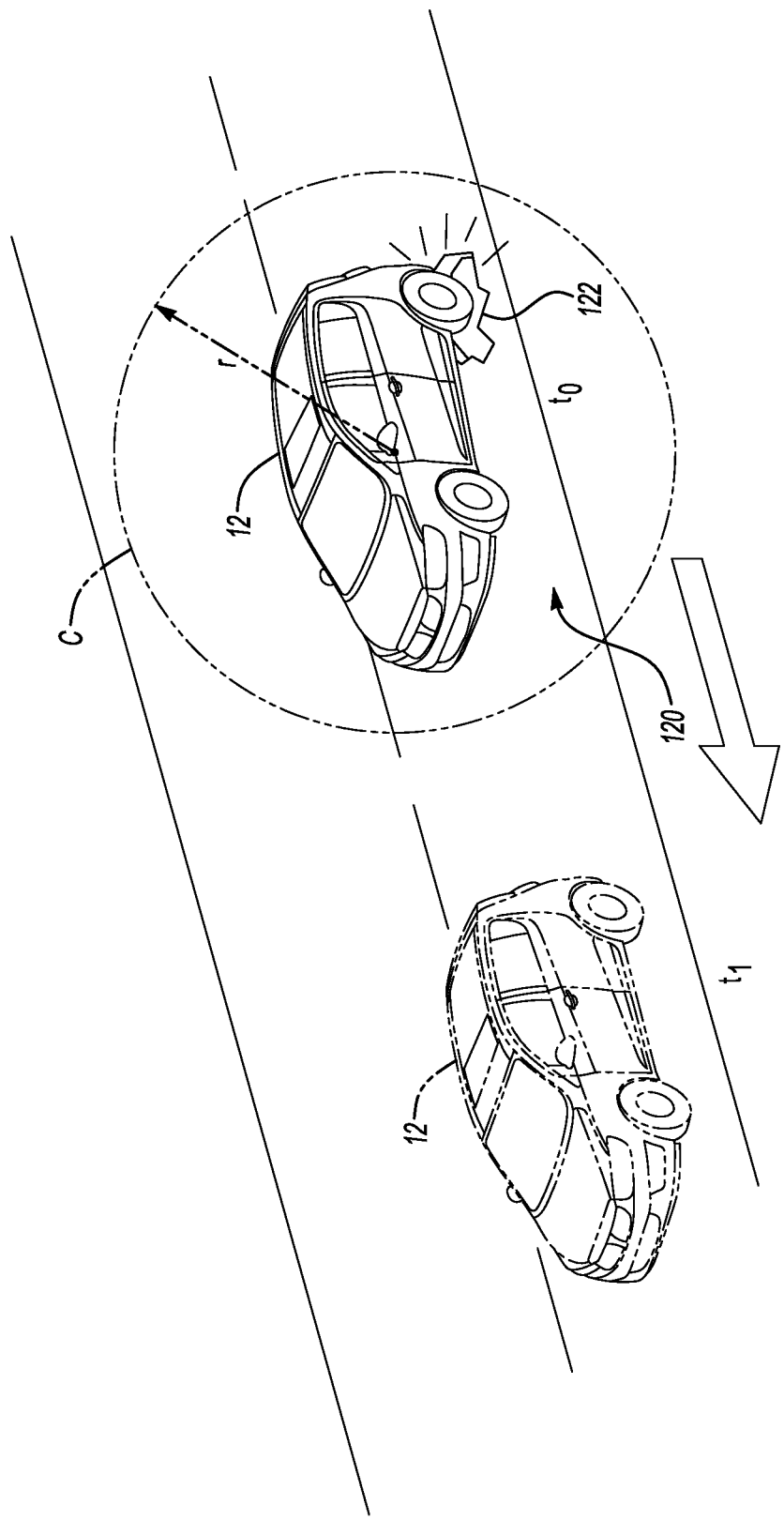
FIG. 3A schematically illustrates an example of a vehicle-related event that did not occur.
Figure 3B:
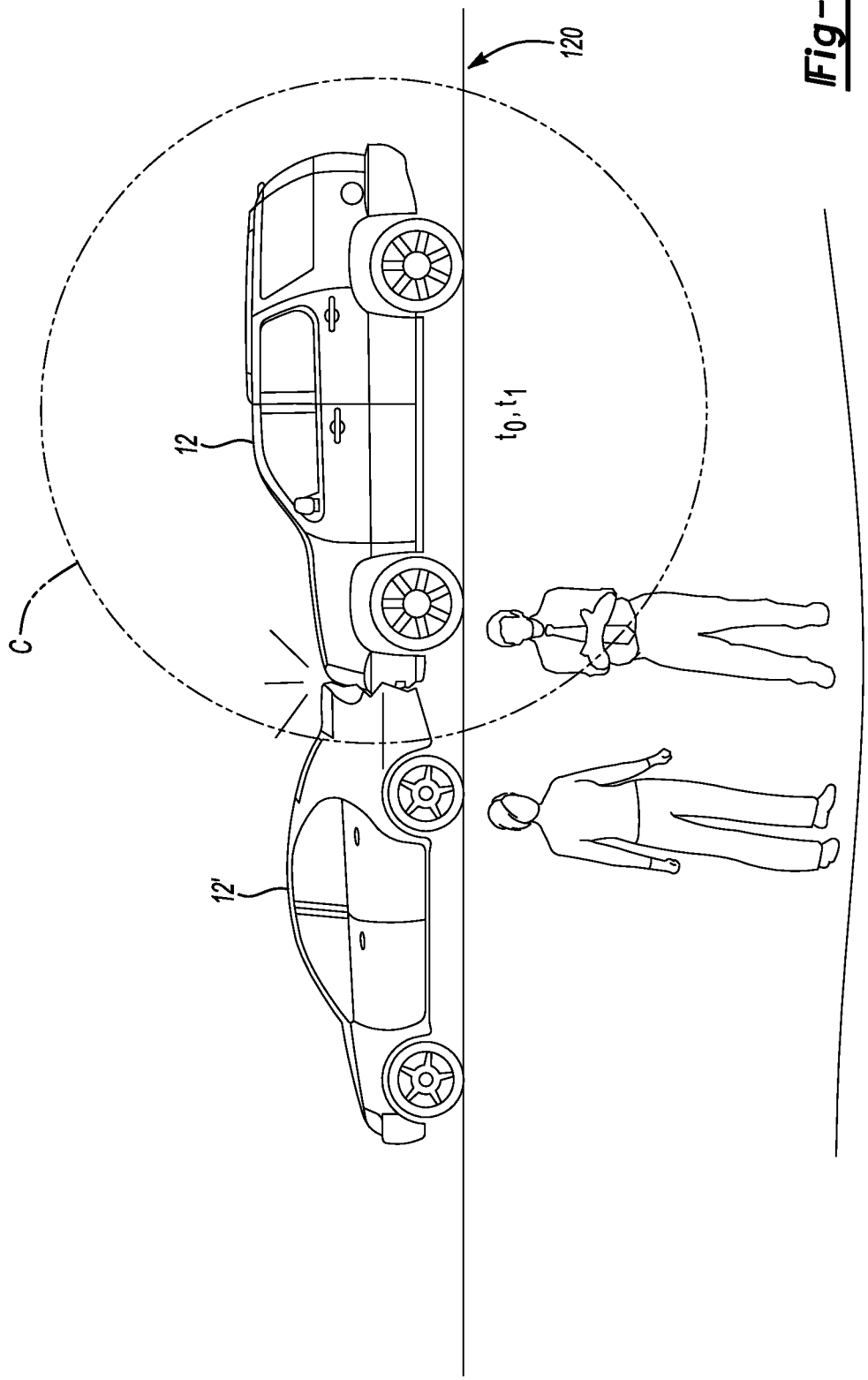
FIG. 3B schematically illustrates an example of a vehicle-related event that did occur.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding vehicle-related events. In an example, the crash sensors 54 provide information regarding the severity of a vehicle collision, such as the angle of impact and the amount of force sustained. The crash sensors 54 also provide information (e.g., in the form of signals) to the telematics unit 14 via the sensor interface 52 regarding any impact sustained or encountered by the vehicle 12. Impacts sustained or encountered by the vehicle 12 may include, e.g., when the vehicle 12 hits a pothole in the road (e.g., as shown in FIG. 3A), when the vehicle 12 hits another vehicle (e.g., as shown in FIG. 3B), and/or the like. In an example, the vehicle crash sensors 54 may include rollover sensors, which are used to detect that the vehicle 12 has turned over from its normal, operating position (i.e., when all four wheels are in contact with the road) to another position (i.e., when two or no wheels are in contact with the road). In an example, vehicle rollover may include when the vehicle 12 is tipped to an angle that is less than or equal to 90° (e.g., the vehicle 12 is tipped 90° when the vehicle 12 is lying on its side) or is tipped between 90° and 180° (e.g., the vehicle 12 is tipped 180° when the vehicle 12 is lying roof-side-down).

Other vehicle sensors 64, connected to various sensor interface modules 66 are operatively connected to the vehicle bus 34. Example vehicle sensors 64 include, but are not limited to, gyroscopes, accelerometers, speed sensors, magnetometers, emission detection and/or control sensors, environmental detection sensors, vehicle heading sensors, vehicle steering angle (i.e., steering wheel position) sensors, wheel sensors, gear shift (i.e., PRNDL) status sensor, and/or the like. One or more of the sensors 64 enumerated above may be used to obtain, e.g., the instantaneous speed of the vehicle 12, a then-current steering wheel angle of the vehicle 12, etc. The data obtained from this/these sensor(s) 64 may be transmitted from the sensor(s) 64 to the telematics unit 14 via the bus 34. Examples of how the data may be used by the cloud 100 will be described in detail below.

Furthermore, some example sensor interface modules 66 include powertrain control, climate control, body control, and/or the like.

In an example, each of the vehicle sensors 54, 64 is associated with its own processor (not shown), which may include computer program(s) for obtaining information from the sensors 54, 64 and either utilizing them to perform various vehicle functions and/or to send the information (e.g., as signals) to another processor in the vehicle 12 (e.g., the processor 36) to be utilized in other computer program(s). For instance, the speed sensor may be associated with its own processor that obtains vehicle speed readings from the speed sensor, and transmits those readings (in the form of signals) to the processor 36 of the telematics unit 14 by the vehicle bus 34.

The vehicle hardware 26 also includes the display 80, which may be operatively directly connected to or in communication with the telematics unit 14, or may be part of the audio component 60. The display 80 may be any human-machine interface (HMI) disposed within the vehicle 12 that includes audio, visual, haptic, etc. The display 80 may, in some instances, be controlled by or in network communication with the audio component 60, or may be independent of the audio component 60. Examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Display), and/or the like.

As mentioned above, the system 10 includes the carrier/communication system 16. A portion of the carrier/communication system 16 may be a cellular telephone system or any other suitable wireless system that transmits signals between the vehicle hardware 26 and land network 22. According to an example, the wireless portion of the carrier/communication system 16 includes one or more cell towers 18, base stations 19 and/or mobile switching centers (MSCs) 20, as well as any other networking components required to connect the wireless portion of the system 16 with land network 22. It is to be understood that various cell tower/base station/MSC arrangements are possible and could be used with the wireless portion of the system 16. For example, a base station 19 and a cell tower 18 may be co-located at the same site or they could be remotely located, or a single base station 19 may be coupled to various cell towers 18, or various base stations 19 could be coupled with a single MSC 20. A speech codec or vocoder may also be incorporated in one or more of the base stations 19, but depending on the particular architecture of the wireless portion of the system 16, the speech codec or vocoder could be incorporated within an MSC 20 or some other network component as well.

Land network 22 may be a conventional land-based telecommunications network that is connected to one or more landline telephones and connects the wireless portion of the carrier/communication network 16 to the telematics service center 24 and the cloud 100. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, wireless networks, such as wireless local networks (WLANs) or networks providing broadband wireless access (BWA), or any combination thereof. Communications between the vehicle 12 and the component(s) of telematics service center 24, e.g., may be established through the land network 22.

The telematics service center 24 of the telematics service provider is designed to provide the vehicle hardware 26 with a number of different system back-end functions. According to the example shown in FIG. 1, the telematics service center 24 generally includes one or more switches 68, internal servers 70, databases 72, live and/or automated advisors 62, 62', processing equipment (or processor) 78, as well as a variety of other telecommunication and computer equipment 74 that is known to those skilled in the art. These various telematics service provider components are coupled to one another by a network connection or bus 76, such as one similar to the vehicle bus 34 previously described in connection with the vehicle hardware 26.

The processor 78, which is often used in conjunction with the computer equipment 74, is generally capable of executing suitable software and/or programs enabling the processor 78 to accomplish a variety of telematics service center 24 functions. Further, the various operations of the telematics service center 24 are carried out by one or more computers (e.g., computer equipment 74, server(s) 70, etc.) programmed to carry out some of the tasks of the telematics service center 24. The computer equipment 74 (including computers) may include a network of internal servers (including server 70) coupled to both locally stored and remote databases (e.g., database 72) of any information processed.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72.

The database(s) 72 at the telematics service center 24 may be designed to store subscriber profile records, subscriber behavioral patterns, or any other pertinent subscriber information.

It is to be appreciated that the telematics service center 24 may be any central or remote facility, manned or unmanned, mobile or fixed, to or from which it is desirable to exchange voice and data communications. As such, the live advisor 62 may be physically present at the telematics service center 24 or may be located remote from the telematics service center 24 while communicating therethrough.

The telematics service center 24 components shown in FIG. 1 may also be virtualized and configured in a cloud computer, that is, in an Internet-based computing environment. For example, for the telematics service center 24, the computer equipment 74 may be accessed as a cloud platform service, or PaaS (Platform as a Service), utilizing cloud infrastructure rather than hosting computer equipment 74 at the telematics service center 24. The database 72 and internal server 70 may also be virtualized as a cloud resource. The cloud infrastructure, known as IaaS (Infrastructure as a Service), typically utilizes a platform virtualization environment as a service, which may include components such as the processor 78, database 72, server 70, and computer equipment 74. In an example, application software and services (such as, e.g., navigation route generation and subsequent delivery to the vehicle 12) may be performed in the cloud computer via the SaaS (Software as a Service). Subscribers, in this fashion, may access software applications remotely via the cloud computer. Further, subscriber service requests may be acted upon by the automated advisor 62', which may be configured as a service present in the cloud computer.

The communications network provider 90 generally owns and/or operates the carrier/communication system 16. The communications network provider 90 includes a mobile network operator that monitors and maintains the operation of the communications network 90. The network operator directs and routes calls, and troubleshoots hardware (cables, routers, network switches, hubs, network adaptors), software, and transmission problems. It is to be understood that, although the communications network provider 90 may have back-end equipment, employees, etc. located at the telematics service center 24, the telematics service center 24 is a separate and distinct entity from the network provider 90. In an example, the equipment, employees, etc. of the communications network provider 90 are located remote from the telematics service center 24. The communications network provider 90 provides the user with telephone and/or Internet services, while the telematics service center 24 provides a variety of telematics-related services (such as, for example, those discussed hereinabove). The communications network provider 90 may interact with the telematics service center 24 to provide services (such as emergency services) to the user.

While not shown in FIG. 1, it is to be understood that in some instances, the telematics service provider operates a data center (which is similar to the telematics service center 24), which receives voice or data calls, analyzes the request associated with the voice or data call, and transfers the call to an application specific telematics service center associated with the telematics service provider. It is further to be understood that the application specific telematics service center may include all of the components of the data center, but is a dedicated facility for addressing specific requests, needs, etc. Examples of application specific telematics service centers include, but are not limited to, emergency services call centers, navigation route call centers, in-vehicle function call centers, or the like.

The example of the vehicle-incident detection system 10 further includes the cloud 100 (i.e., the cloud computing system as mentioned above). The cloud 100 is an Internet-based computing environment, and is accessible by the vehicle 12 (i.e., by the telematics unit 14) via the Internet or the world-wide-web. The cloud 100 may be in selective communication with the vehicle 12 (i.e., the telematics unit 14) and/or with the telematics service center 24. The cloud 100 includes multiple pieces of hardware (physical and/or virtual) operatively coupled over a network so they can perform specific computing tasks, such as tasks related to the examples of the method disclosed herein. The cloud 100 includes physical hardware 102, such as processor(s) 104, memory device(s) 106, and networking equipment 108. The virtual hardware is a type of software that is processed by the physical hardware 102 and designed to emulate specific hardware. As an example, virtual hardware may include a virtual machine (VM), i.e., a software implementation of a computer that supports execution of an application like a physical machine.

The processors 104 are configured to run software 110, and the software 110 in this example system 10 includes the previously mentioned application 112. The application 112 includes computer readable code embedded on a non-transitory, tangible computer readable medium for extracting vehicle data from the message(s) received from the vehicle 12, and for analyzing the vehicle data to determine that a vehicle-related event has or has not occurred. The application may also include computer readable code for making the determination based upon the analysis.

The memory device(s) 106 of the cloud 100, for example, may be configured to store the application 112 and other software. The memory device(s) 106 may also be configured to store information, such as the vehicle data obtained from the messages received from the vehicle 12. The vehicle data may be stored temporarily or permanently. If stored temporarily, the vehicle data may be deleted from the memory device(s) 106 once the vehicle data has been used to determine that a vehicle-related event has or has not occurred.

Furthermore, the networking equipment 108 may be used to send a notification, e.g., to the telematics service center 24 that the application 112 has determined that a vehicle-related event has occurred.

Examples of the vehicle-incident detection method are described hereinbelow in conjunction with all of the figures. The example detection methods are accomplished by analyzing vehicle data obtained at the time the event was initially detected and vehicle data obtained at a time(s) subsequent to the initial detection of the event. In the examples of the method disclosed herein, the analysis and the determination is performed by the application 112 that is resident in the cloud 100. However, it is believed that the analysis and determination may otherwise be performed by an application resident elsewhere, such as on computing equipment at the telematics service center 24 or another facility.

In the examples of the method disclosed herein, when the application 112 in the cloud 100 determines that a vehicle-related event has occurred, then networking equipment 108 of the cloud 100 may be used to notify an appropriate third party (e.g., the telematics service center 24) of the same. Upon receiving the notification, the service center 24 or other third party may, e.g., contact an appropriate authority to dispatch emergency and/or medical services to the vehicle 12.

An example of the method will now be described herein in detail. At step 200 in FIG. 2, a vehicle-related event is initially detected. In one example, the vehicle-related event is initially detected by one or more of the sensors 54 disposed in or on the vehicle 12. Sensor(s) 54 that perform the initial detection include a processing chip or may have some other processing unit associated therewith. When an impact on the vehicle 12 occurs, the sensor(s) 54 will generate a signal containing raw data, such as information indicating that an impact has occurred, the location on the vehicle 12 where the impact was detected (e.g., on the driver side door, on the rear bumper, etc.), the severity of the impact, and/or the like. The processing chip or unit associated with the sensor(s) 54 utilizes the raw data to initially determine that a vehicle-related event has occurred (i.e., to recognize a potential vehicle-related event). Upon making this initial determination, the processing chip or unit of the sensor(s) 54 will generate another signal, and then send that signal to the telematics unit 14. The other signal will include data indicating that the vehicle-related event has been initially detected. Further, upon receiving the signal from the sensor(s) 54, the telematics unit 14 (via the processor 36 running suitable software program(s) for processing the signal) is notified that a vehicle-related event has been initially detected.

In another example, the vehicle-related event may be initially detected by the telematics unit 14. In this example, the sensor(s) 54 may be configured to generate a signal containing the raw data when an impact to the vehicle 12 occurs. This signal is not processed by a processing unit of the sensor(s) 54, but rather is sent to the telematics unit 14 via the bus 34.

Upon receiving the signal including the raw data from the sensor(s) 54, the processor 36 of the telematics unit 14 will extract the raw data from the signal, and then process the data to render an initial determination that the vehicle-event has occurred.

In instances where the telematics unit 14 performs the initial detecting of the vehicle-related event, in an example, the processor 36 may be configured to run a software program that monitors for specific controller area network (CAN) bus messages including signals generated by the sensor(s) 54. Should the telematics unit 14 receive a signal generated by the sensor(s) 54 during the monitoring; the processor 36 will process the raw data as previously mentioned to initially determine that the vehicle-related event has occurred.

In another example, a vehicle occupant (e.g., the vehicle driver) may detect a potential vehicle-related event, and may notify the telematics unit 14 by reciting the same into the microphone 28 associated with the telematics unit 14, pressing an appropriate button 32 associated with the telematics unit 14, or the like. In this example, the telematics unit 14 may include speech recognition software (i.e., speech-to-text software) that converts the vehicle occupant's speech into text that may be implemented into a message sent to the cloud 100.

Figure 2:
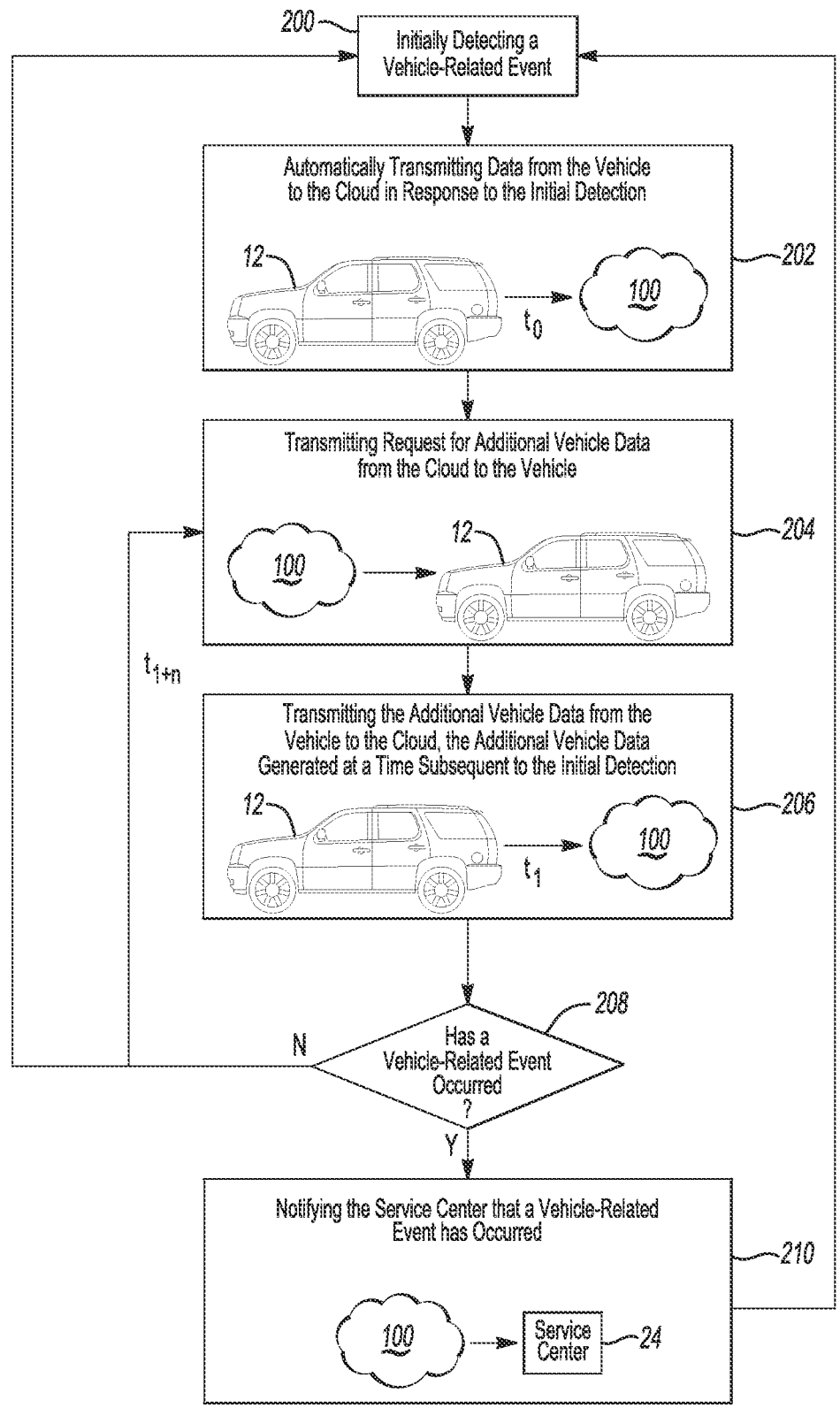
FIG. 2 is a flow diagram depicting an example of a vehicle-incident detection method.

Upon being notified of or initially detecting that a vehicle-related event has occurred, still at step 200 in FIG. 2, the telematics unit 14 will solicit vehicle data from various vehicle sensors 64 (e.g., the speed sensor(s)) and vehicle hardware components 26 (e.g., the location detection component 44). In an example, an application stored in the telematics unit 14 and run by the processor 36 of the telematics unit 14 will initialize and begin to look for vehicle data. Solicitation of the vehicle data may be accomplished, e.g., by transmitting a request (e.g., in the form of signal(s)) for the vehicle data from the telematics unit 14 to the sensor(s) 64 and/or to the vehicle hardware component(s) 26. In an example, the vehicle data solicited by the telematics unit 14 includes vehicle location data at the time the vehicle-related event was initially detected. This location data is data obtained at time $t_0$ (i.e., the time the vehicle-related event was initially detected), and in an example, the location data is obtained from the location detection component 44, either alone or in combination with dead reckoning software (i.e., inputs from the wheel sensors and the steering wheel sensors are used to calculate the vehicle travel direction and distance). In another example, the vehicle data solicited by the telematics unit 14 includes the vehicle speed at the time the vehicle-related event was initially detected (i.e., the vehicle speed at time $t_0$). The vehicle speed data may, in an example, be obtained by the telematics unit 14 from the speed sensor 64 disposed in the vehicle 12.

In another example, the telematics unit 14 may solicit the vehicle location data, the vehicle speed data, and other vehicle data that was also obtained at time $t_0$. Examples of the other vehicle data include a then-current position of a gear shift of the vehicle transmission system of the vehicle 12 (e.g., drive mode, park mode, etc.), vehicle noise, vehicle rollover data, and data pertaining to vehicle heading and/or steering angle.

Upon receiving the vehicle data taken at time $t_0$ (again, the time that the event was initially detected), the application 92 resident in the processor 36 of the telematics unit 14 automatically formulates a message including the vehicle data (as shown at step 202 in FIG. 2). In an example, this message is formulated in a format suitable for transmission to the cloud 100. Examples of suitable formats include a short message service (SMS) message or a packetized data message.

At step 202, the message transmitted by the telematics unit 14 is received by the network equipment 108 in the cloud 100. Upon receiving the message, the networking equipment 108 identifies the message as one pertaining to the vehicle-incident detection method described herein. Upon receipt of the message, a packet data session opens and information is exchanged. The message may include a header or identifier that is recognizable to the network equipment 108. Upon identifying the message, the network equipment 108 then forwards the message to the processor 104 for processing. The vehicle data is extracted from the message by the application 112 (which is run by the processor 104) and, in some instances, may be stored in one of the memory devices 106 in the cloud 100. In instances where the vehicle data is encrypted, upon extracting the vehicle data from the message, the application 112 may further include computer readable code for decrypting the extracted encrypted data. The decrypted data is then processed and/or stored in the memory device 106.

At step 204 in FIG. 2, and in response to a command initiated by the processor 104, the cloud 100 (via the networking equipment 108) transmits a message (which may be in the same format as the message received from telematics unit 14) back to the telematics unit 14 of the vehicle 12. This message includes a request for additional vehicle data from the vehicle 12. In an example, the additional vehicle data requested by the cloud 100 includes vehicle data generated at a time subsequent to the time at which the vehicle-related event was initially detected. In other words, the vehicle data requested by the cloud 100 is vehicle data obtained by the vehicle 12 at a time subsequent to time $t_0$. The time subsequent to time $t_0$ is referred to as time $t_1$, and in an example, time $t_1$ occurs no more than five seconds after time $t_0$. Any times that follow time $t_1$ are each referred to as times $t_{1+n}$, where n is an integer equal to or greater than 1. Examples of times that follow time $t_1$ may include time $t_2$ for a time immediately after time $t_1$; time $t_3$ for a time immediately after time $t_2$; and so on. Further, in an example, time $t_2$ occurs not more than five seconds after time $t_1$; time $t_3$ occurs not more than five seconds after time $t_2$; and so on. In an example, vehicle data generated at time $t_1$ (i.e., the additional vehicle data) includes vehicle location data obtained at time $t_1$ and vehicle speed data obtained at time $t_1$. In another example, the vehicle data generated at time $t_1$ (again, the additional vehicle data) includes vehicle location data obtained at time $t_1$, vehicle speed data obtained at time $t_1$, and other vehicle data generated at time $t_1$ (e.g., gear shift location data, rollover data, vehicle heading and/or steering angle data, vehicle noise data, etc.). Data obtained at subsequent times $t_2$, $t_3$, etc. is referred to as subsequent additional data or subsequent additional vehicle data.

At step 206, upon receiving the message from the cloud 100 including the request for the additional vehicle data, the telematics unit 14 solicits the requested, additional data from the appropriate sensor(s) 64 and/or vehicle hardware component(s) 26. In an example, the solicitation for the additional vehicle data is accomplished by sending a request (e.g., in the form of signal(s)) to the appropriate vehicle sensor(s) 64 and/or hardware component(s) 26. In response to the request, the sensor(s) 64 and/or the component(s) 26 sends the requested additional vehicle (which was obtained at time $t_1$) data back to the telematics unit 14 over the vehicle bus 34. The application 92 is run by the processor 36 to formulate another message (e.g., an SMS message or a packetized data message) including the requested, additional vehicle data obtained at time $t_1$. The other message is then transmitted from the telematics unit 14 to the cloud 100.

The other message is received by the networking equipment 108 in the cloud 100, which proceeds to identify the message as one pertaining to the vehicle-incident detection process. Upon identifying the other message, the networking equipment 108 forwards the other message to the processor 104 for processing. The processor 104 running the application 112 extracts the additional vehicle data from the other message and, in an example, stores the additional vehicle data in one of the memory devices 106 in the cloud 100.

At step 208, the processor 104 retrieves the vehicle data (i.e., the vehicle data obtained at/for time $t_0$) and the additional vehicle data (i.e., the vehicle data obtained at/for time $t_1$) from the memory device 106. It is to be understood that all of the data may be temporarily stored in RAM (random access memory) modules of the memory device 106 and then deleted after the analysis or after a predetermined time period. The processor 104 utilizes at least some of the vehicle data obtained at time $t_0$ and at least some of the additional vehicle data obtained at time $t_1$ in its analysis for determining that the initially detected vehicle-related event (i.e., the potential event) is a vehicle-related event that has occurred or has not occurred. In an example, the processor 104 analyzes the vehicle location data and the vehicle speed data obtained at time $t_0$ and the vehicle location data and the vehicle speed data obtained at time $t_1$. Examples of how the vehicle location data and the vehicle speed data at times $t_0$ and $t_1$ are used, by the processor 104, to determine if a vehicle-related event occurred are provided below in conjunction with FIGS. 3A and 3B.

FIG. 3A illustrates an example of a vehicle-related event that did not occur. In this example, some impact to or on the vehicle 12 occurs as the result of the vehicle 12 hitting a pothole 122 in the road 120. The (potential) vehicle-related event (i.e., the vehicle 12 hitting the pothole 122) has been initially detected (e.g., by the crash sensor 54) at time $t_0$, messages have been sent back and forth between the vehicle 12 and the cloud 100 to obtain vehicle location data and vehicle speed data at times $t_0$ and $t_1$ (e.g., 5 seconds after the vehicle-related event was initially detected), and such data has been transmitted to the cloud 100 and stored in one of the memory devices 106 in the cloud 100. The processor 104 retrieves the data from the memory devices 106 to perform its analysis on the data. In this example, the vehicle location data at time $t_0$ reflects the location of the vehicle 12 at the time that the vehicle 12 hit the pothole 122. Further, the vehicle speed data at time $t_0$ reflects the speed of the vehicle 12 at the time that vehicle hit the pothole 122.

In an example, the processor 104 uses a predefined zone at time $t_0$ to determine if the potential vehicle event initially detected/noted at time $t_0$ amounts to a vehicle-related event. The predefined zone may be a circle around the vehicle 12, where the circle has a diameter that is equal to the length of the vehicle 12+½(length of the vehicle 12). The processor 104 utilizes the vehicle location data at time $t_0$ as a center point of the circle, and the circle is drawn around the vehicle location at time $t_0$ utilizing the radius r of the calculated diameter to define the circle or zone. An example of a circle C (i.e., zone) drawn around the vehicle location at time $t_0$ is shown in phantom lines in FIG. 3A. In an example, the vehicle 12 has a length of about 16 feet. The diameter calculated for this vehicle 12 is 16 ft+½(16 ft)=24 ft. In this example, the radius r used to define the circle or zone is 12 ft, and the vehicle location at time $t_0$ is used as the center point of the circle or zone. The length of the vehicle 12 may be sent in the original message to the cloud 100 as default data that is included in the message.

The processor 104 will then determine if the vehicle location at time $t_1$ (e.g., the vehicle location taken 5 seconds after the vehicle location at the time $t_0$) falls within the predefined zone (i.e., the circle C drawn around the vehicle location at $t_0$). For instance, if the radius of the circle is 12 feet, and the vehicle location at time $t_1$ is 10 feet away from the vehicle location at time $t_0$, then the vehicle 12 at $t_1$ is within the circle or zone. However, if the vehicle location at time $t_1$ is 15 feet away from the vehicle location at time $t_0$, then the vehicle 12 at time $t_1$ is located outside of the circle or zone. This latter scenario is shown in FIG. 3A, where the vehicle 12 depicted in dotted lines is the position of the vehicle 12 at time $t_1$, and the vehicle 12 at time $t_1$ is clearly outside of the circle C. In this scenario, since the vehicle 12 at time $t_1$ is outside of the circle C, the processor 104 will conclude that the vehicle-related event did not occur without having to look at the other vehicle data and other additional vehicle data. However, if programmed to do so, the processor 104 may also analyze speed and/or other data and additional data in order to increase the robustness of the assessment that the vehicle-related event did not occur.

In some examples, the processor 104 will also compare the vehicle speeds at times $t_0$ and $t_1$. Comparing may be accomplished, for instance, by taking the difference between the two speeds. In one example, when the difference between the vehicle speeds is 70% or less, then the processor 104 will conclude that a vehicle-related event did not occur. In another example, when the speed at time $t_0$ is at least 50% of the speed at time $t_1$, the processor 104 will conclude that a vehicle-related event did not occur. In still another example, when the difference in speed between times $t_0$ and $t_1$ is greater than 1 ft/sec (i.e., about 0.7 miles per hour), the processor 104 will conclude that a vehicle-related event did not occur.

In the example shown in FIG. 3A, the combination of the location and speed data may increase the robustness of the assessment that no vehicle-related event has occurred.

FIG. 3B illustrates an example of a vehicle-related event that has occurred. In this example, some impact to or on the vehicle 12 occurs as the result of the vehicle 12 rear-ending another vehicle 12' while driving along the road 120. The vehicle location and speed at time $t_0$ (i.e., the time that the potential event was initially detected) and time $t_1$ (a time after time $t_0$) may be analyzed as described above in reference to FIG. 3A. In this scenario, the location of the vehicle 12 at time $t_1$ falls within the circle C or zone defined around the vehicle using the location at the time the event occurred (i.e., at time $t_0$) as the center point. In this example, the location at $t_0$ is equal to the location at $t_1$ (within the zone), and thus the processor 104 may conclude that a vehicle-related event has occurred. The processor 104 may also compare the vehicle speed at times $t_0$ and $t_1$. In one example, when a reduction in vehicle speed from time $t_0$ to time $t_1$ is greater than 70%, then the processor 104 will conclude that a vehicle-related event has occurred. In another example, when the speed at time $t_0$ is less than 50% of the speed at time $t_1$, the processor 104 will conclude that a vehicle-related event has occurred. In still another example, when the difference in speed between times $t_0$ and $t_1$ is equal to or less than 1 ft/sec (i.e., about 0.7 miles per hour), the processor 104 will conclude that a vehicle-related event has occurred. In the example shown in FIG. 3B, the vehicle 12 has not changed locations and the speed at time $t_1$ is zero. From the analysis of this data, the processor 104 may conclude that a vehicle-related event has occurred.

In addition to vehicle location and speed data, the processor 104 may also consider other vehicle data in its analysis. Examples of this other vehicle data include vehicle gear shift data, wheel data, steering wheel data, rollover data, etc. The use of multiple types of data in the analysis may increase the confidence factor of the conclusion. In some instances, the telematics unit 14 may be programmed to automatically include one or more of these other types of vehicle data in the messages sent to the cloud 100 and/or the cloud 100 component(s) may be programmed to automatically request one or more of these other types of vehicle data after receiving notification that a vehicle-related event has been initially detected.

In one example, the processor 104 may consider vehicle data indicative of the location of the vehicle gear shift at times $t_0$ and $t_1$. For instance, a change in the gear shift of the vehicle transmission system from a drive mode to a park mode within the time spanning from time $t_0$ to time $t_1$ may be further evidence that a vehicle-related event has occurred. In another instance, if the gear shift position remains in drive mode from time $t_0$ to time $t_1$, then this may be evidence that a vehicle-related event has not occurred, if, for example, other vehicle data also indicates that a vehicle-related event has not occurred.

In another example, the processor 104 may also consider vehicle data indicative of a rollover event. For instance, if the rollover data at time $t_1$ indicates that the vehicle 12 has at least partially rolled over, then the data may be further evidence that the vehicle-related event has occurred.

In still another example, the processor 104 may consider ambient vehicle sound (e.g., an audio profile or spectrum, decibel level, etc.) at time $t_1$ when determining whether a vehicle-related event has or has not occurred. Examples of ambient vehicle sounds include the level and spectral content of sound that would normally be present in the vehicle 12 due to the operation thereof and/or expected road noise during the operation of the vehicle 12. Specific examples may include tire noise and wind noise, both of which have specific spectral content. Normal patterns for these sounds may depend upon the speed of the vehicle 12. In an example, ambient sound detected at time $t_1$ that is indicative of driving may be evidence that the vehicle-related event has not occurred, while ambient sound significantly below normal driving levels or of significantly different spectral content may be indicative that a vehicle-related event has occurred. For example, if the ambient sounds are well below normal driving noise levels, this may be evidence that the vehicle has stopped suddenly, indicating that a vehicle-related event has occurred.

The processor 104, in yet another example, may also consider vehicle heading and/or steering wheel data when determining whether a vehicle-related event did or did not occur. For instance, changes in the vehicle heading from time $t_0$ to time $t_1$ and/or updates to the steering wheel input from $t_0$ to $t_1$ may be used as evidence that a vehicle-related event has not occurred. If the heading and/or steering wheel data that is received after the potential vehicle-related event is initially detected is indicative of normal heading and/or steering wheel patterns, then this data is indicative that a vehicle-related event has not occurred.

It is believed that other data demonstrating normal use patterns of the vehicle 12, or other data demonstrating deviations from normal use patterns of the vehicle 12 may also be used as evidence for the determination of whether or not a vehicle-related event has nor has not occurred. Normal use patterns shown by the additional vehicle data (i.e., the data at time $t_1$) are evidence that the vehicle-related event did not occur.

In some instances, the vehicle data analyzed by the processor 104 produces non-conclusory results, or results having an insufficient confidence level/interval. The system designer may select the confidence level to achieve a desired system performance. As examples, the confidence interval may be set low to ensure that even minor vehicle incidents are reported, or the confidence interval may be set high to ensure that severe vehicle incidents alone are reported. The calibration of the confidence interval may be performed utilizing a representative vehicle fleet, driving through controlled test events, and calibrating sensor inputs. The processor 104 may execute a program that determines the confidence interval for the results and compares the confidence interval with a preset confidence level.

Further, in instances where the vehicle data obtained at time $t_0$ and the additional vehicle data at time $t_1$ is insufficient to render a determination that a vehicle-related event has occurred at step 208 in FIG. 2, the processor 104 may consider subsequent additional vehicle data taken at times $t_{1+n}$, where n is any integer equal to or greater than 1. In these instances, the method loops back to step 204 in FIG. 2. As an example, the cloud 100 may determine that the vehicle location and speed is too close to a threshold value to rule out the possibility of an event. For example, the location at time $t_1$ may be 1 foot outside of the circle C or zone defined for time $t_0$ and the speed may be 0.9 ft/sec or 1.1 ft/sec. While the analysis of this data and additional data indicates that a vehicle-related event has not occurred, the confidence value associated with this conclusion may be insufficient to support the conclusion. As such, analysis of subsequent additional data may be desirable.

In an example, the cloud 100 may request from the telematics unit 14 the subsequent additional vehicle data, which was obtained at a time subsequent to time $t_1$. This subsequent additional data is vehicle data obtained at time $t_2$, and such data, when received from the telematics unit 14 in yet another message, may be factored into the analysis performed by the processor 104 running application 112. For example, if the processor 104 determines that there is a decrease in vehicle speed at time $t_1$ of 70% (which, in an example, is the percentage that lies directly on the threshold between a vehicle-related event occurrence and no vehicle-related event occurrence), then further data may be requested from the cloud 100 to verify that a vehicle-related event did not occur. It is to be understood that the cloud 100 may request and receive additional vehicle data for as many times after time $t_0$ as desired (e.g., at $t_2$, $t_3$, $t_4$, etc.). Additionally, the request for subsequent additional data may be for the same data previously analyzed and/or for new data (e.g., noise data, steering wheel data, etc.)

In another example, the processor 104 may verify that a vehicle-related event has or has not occurred by initiating a confirmation call to the vehicle 12.

When the processor 104 determines that a vehicle-related event has occurred, at step 210 in FIG. 2, the cloud 100 will notify the telematics service center 24. In response to the notification, the telematics service center 24 may then contact an appropriate authority to dispatch emergency and/or medical assistance to the vehicle 12 and/or refer to a user profile stored in one of the databases 72 at the service center 24 to obtain an emergency contact previously provided by the subscriber. At the same time, the method resets to step 200 for analyzing another detected vehicle-related event.

Further, when the processor 104 determines that a vehicle-related event did not occur, the cloud 100 does not send a notification to the service center 24. Further, the method resets to step 200 for analyzing a subsequently detected vehicle-related event.

While several examples have been described in detail, it will be apparent to those skilled in the art that the disclosed examples may be modified. Therefore, the foregoing description is to be considered non-limiting.

The invention claimed is:

1. A vehicle-incident detection method, comprising:
receiving vehicle data at a cloud computing system from a vehicle, the vehicle data being generated by the vehicle in response to an initial detection of a potential crash event, wherein the cloud computing system is remote from the vehicle;
after receiving the data, by the cloud computing system, requesting additional vehicle data from the vehicle, the additional vehicle data being generated by the vehicle at a time subsequent to the initial detection of the potential crash event;
receiving the additional vehicle data from the vehicle; and
by an application resident in the cloud computing system, analyzing the vehicle data and the additional vehicle data to verify if the initially detected potential crash event occurred, the application including computer readable code embedded on a non-transitory, tangible computer readable medium for performing the analyzing;
wherein:
both the vehicle data and the additional vehicle data are generated by the vehicle, not by the vehicle occupant;
the vehicle data includes at least a vehicle speed and a vehicle location generated by the vehicle at a time $t_0$;
$t_0$ is the time when the potential crash event is initially detected;
the additional vehicle data includes at least the vehicle speed and the vehicle location generated by the vehicle at a time $t_1$; and
$t_1$ is a time subsequent to the initial detection of the potential crash event.

2. The vehicle-incident detection method as defined in claim 1 wherein:
the analyzing includes comparing the vehicle data generated at time $t_0$ and the additional vehicle data generated at time $t_1$; and
the method further comprises determining that the potential crash event was not a crash when the vehicle location at time $t_1$ is outside of a predefined position zone for the vehicle at time $t_0$, and when the vehicle speed at time $t_0$ is at least ½ the vehicle speed at time $t_1$.

3. The vehicle-incident detection method as defined in claim 2, further comprising resetting the application upon determining that the crash did not occur.

4. The vehicle-incident detection method as defined in claim 2 wherein the predefined position zone is defined by a length of the vehicle+½(the length of the vehicle).

5. The vehicle-incident detection method as defined in claim 1, further comprising:
receiving subsequent additional vehicle data at a time $t_{1+n}$, wherein n is an integer equal to or greater than 1, wherein the subsequent additional vehicle data is generated by the vehicle, not by the vehicle occupant; and
analyzing the vehicle data, the additional vehicle data, and the subsequent additional vehicle data to verify whether or not the potential crash event was a crash.

6. The vehicle-incident detection method as defined in claim 1, further comprising resetting the application upon verifying that a crash occurred.

7. The vehicle-incident detection method as defined in claim wherein:
the analyzing includes comparing the vehicle data generated at time $t_0$ and the additional vehicle data generated at time $t_1$; and
the method further comprises:
determining that a crash occurred based on the comparison; and
notifying a vehicle service center that the crash occurred.

8. The vehicle-incident detection method as defined in claim 1 wherein the vehicle data and the additional vehicle data, at time $t_0$ and $t_1$, respectively, further include vehicle gearshift location data, rollover sensor data, ambient vehicle sound data, vehicle heading data, steering angle data, or combinations thereof.

9. A vehicle-incident detection method, comprising:
initially detecting a potential crash event;
via a telematics unit operatively disposed in a vehicle, automatically transmitting data from the vehicle to a cloud computing system in response to the initial detection, the data being associated with a vehicle system, wherein the cloud computing system is remote from the vehicle;
in response to a request received from the cloud computing system, transmitting additional data from the vehicle via the telematics unit to the cloud computing system, the additional data being associated with the vehicle system and generated at a time subsequent to the initial detection of the potential crash event; and
by an application resident in the cloud computing system, analyzing the data and the additional data to verify if the initially detected potential crash event occurred, the application including computer readable code embedded on a non-transitory, tangible computer readable medium for performing the analyzing;
wherein:
both the data and the additional data are generated by the vehicle, not by the vehicle occupant;
the data includes at least a vehicle speed and a vehicle location generated at a time $t_0$, wherein $t_0$ is the time of the initial detection of the potential crash event;
the additional data includes at least the vehicle speed and the vehicle location generated at a nine $t_1$; and
$t_1$ is a time subsequent to the initial detection of the potential crash event.

10. The vehicle-incident detection method as defined in claim 9 wherein the initial detection is performed by at least one sensor operatively disposed in or on the vehicle.

11. The vehicle-incident detection method as defined in claim 9 wherein prior to automatically transmitting the data from the vehicle, the method further comprises, by a processor of the telematics unit, formulating any of a short message service (SMS) message or a packetized data message that includes the data, wherein the processor is to execute computer readable code embedded in a non-transitory, tangible computer readable medium for performing the formulating.

12. The vehicle-incident detection method as defined in claim 9 wherein the time $t_1$ occurs no more than five seconds after the time $t_0$.

13. The vehicle-incident detection method as defined in claim 9, further comprising:
receiving subsequent additional data at a time $t_{1+n}$, wherein n is an integer equal to or greater than 1, wherein the subsequent additional data is generated by the vehicle, not by the vehicle occupant; and
analyzing the data, the additional data, and the subsequent additional data to verify whether or not the potential crash event was a crash.

14. A vehicle-incident detection system, comprising:
a vehicle, including:

at least one sensor disposed in or on the vehicle, the at least one sensor to generate a signal indicative of a potential crash event;

a telematics unit disposed in the vehicle and selectively and operatively connected to the at least one sensor, the telematics unit to: i) receive the signal from the at least one sensor, ii) initially detect, at a time $t_0$, the potential crash event based on the signal, iii) obtain vehicle data for the time $t_0$ from at least one vehicle system, excluding data from a vehicle occupant, upon making the initial detection, and iv) obtain additional vehicle data from the at least one vehicle system data from the vehicle occupant, at a time $t_1$ that is subsequent to the time $t_0$; and a processor operatively associated with the telematics unit, the processor to execute computer readable code embedded on a tangible, non-transitory computer readable medium for formulating messages, one of the messages including the vehicle data obtained at the time $t_0$ and an other of the messages including the additional vehicle data obtained at the time $t_1$; and a cloud computing system, remote from the vehicle, including:
networking equipment to receive the messages from the telematics unit; and
processing equipment to run an application stored in a memory of the cloud computing system, the application including computer readable code, embedded on an other tangible, non-transitory computer readable medium, for extracting the vehicle data from the messages and for analyzing the vehicle data and the additional vehicle data to verify if the initially detected potential crash event occurred.

15. The vehicle-incident detection system as defined in claim 14 wherein the vehicle data is at least a vehicle location and a vehicle speed.

16. The vehicle-incident detection system as defined in claim 15 wherein the messages are formulated as short message service (SMS) messages or packetized data messages.

17. The vehicle-incident detection system as defined in claim 14 wherein the time $t_1$ represents a time occurring no more than five seconds after the time $t_0$.

18. The vehicle-incident detection system as defined in claim 14 wherein:
the computer readable code for analyzing the vehicle data includes computer readable code for comparing the vehicle data obtained at the time $t_0$ and the additional vehicle data obtained at the time $t_1$; and
the application further includes computer readable code for determining that the potential crash event was not a crash when the vehicle location at the time $t_1$ is outside of a predefined position zone for the vehicle at the time $t_0$, and when the vehicle speed at the time $t_0$ is at least ½ the vehicle speed at the time $t_1$.

19. The vehicle-incident detection system as defined in claim 14 wherein:
the computer readable code for analyzing the vehicle data includes computer readable code for comparing the vehicle data obtained at the time $t_0$ and the additional vehicle data obtained at the time $t_1$;
the application further includes computer readable code for determining that a crash occurred based on the comparing; and
the network equipment of the cloud computing system is further configured to notify a vehicle service center that the crash occurred.

20. The vehicle-incident detection system as defined in claim 14 wherein the application further includes computer readable code for resetting the application.

21. A vehicle-incident detection method, comprising:
receiving vehicle data at a cloud computing system from a vehicle, the vehicle data being generated by the vehicle in response to an initial detection of a potential crash event, wherein the cloud computing system is remote from the vehicle;
after receiving the data, by the cloud computing system, requesting additional vehicle data from the vehicle, the additional vehicle data being generated by the vehicle at a time subsequent to the initial detection of the potential crash event;
receiving the additional vehicle data from the vehicle;
by an application resident in the cloud computing system, analyzing the vehicle data and the additional vehicle data to verify if the initially detected potential crash event occurred, the application including computer readable code embedded on a non-transitory, tangible computer readable medium for performing the analyzing;
wherein:
both the vehicle data and the additional vehicle data are generated by the vehicle, not by the vehicle occupant;
the vehicle data includes at least a vehicle speed and a vehicle location generated by the vehicle at a time $t_0$;
$t_0$ is the time when the potential crash event is initially detected;
the additional vehicle data includes at least the vehicle speed and the vehicle location generated by the vehicle at a time $t_1$; and
$t_1$ is a time subsequent to the initial detection of the potential crash event;
receiving subsequent additional vehicle data at a time $t_{1+n}$, wherein n is an integer equal to or greater than 1, wherein the subsequent additional vehicle data is generated by the vehicle, not by the vehicle occupant; and
analyzing the vehicle data, the additional vehicle data, and the subsequent additional vehicle data to verify whether or not the potential crash event was a crash.

22. The vehicle-incident detection method as defined in claim 21 wherein:
the analyzing includes comparing the vehicle data generated at time $t_0$ and the additional vehicle data generated at time $t_1$; and
the method further comprises determining that the potential crash event was not the crash when the vehicle location at time $t_1$ is outside of a predefined position zone for the vehicle at time $t_0$, and when the vehicle speed at time $t_0$ is at least ½ the vehicle speed at time $t_1$.

23. The vehicle-incident detection method as defined in claim 22, further comprising:
resetting the application upon determining that the crash did not occur; or
resetting the application upon verifying that the crash occurred.

* * * * *